United States Patent

Oda et al.

[11] Patent Number: 5,965,026
[45] Date of Patent: Oct. 12, 1999

[54] PACKING MATERIAL FOR HIGH-PERFORMANCE LIQUID CHROMATOGRAPHY

[75] Inventors: Hirofumi Oda, Chiba; Yoko Oda, Hyogo, both of Japan

[73] Assignee: Daicel Chemical Industries, Ltd., Osaka, Japan

[21] Appl. No.: 08/913,609

[22] PCT Filed: Dec. 20, 1996

[86] PCT No.: PCT/JP96/03737

§ 371 Date: Aug. 21, 1997

§ 102(e) Date: Aug. 21, 1997

[87] PCT Pub. No.: WO97/23778

PCT Pub. Date: Jul. 3, 1997

[30] Foreign Application Priority Data

Dec. 21, 1995 [JP] Japan .................. 7-333758
Dec. 2, 1996 [JP] Japan .................. 8-321505

[51] Int. Cl.⁶ .................. B01D 15/08
[52] U.S. Cl. .................. 210/635; 210/656; 210/198.2; 210/502.1; 96/101; 502/402; 502/404
[58] Field of Search .................. 210/634, 635, 210/656, 198.2, 502.1; 96/101; 428/403, 404, 407; 502/402, 404; 536/30, 55.1, 56, 58

[56] References Cited

U.S. PATENT DOCUMENTS

| | | | |
|---|---|---|---|
| 4,842,935 | 6/1989 | Shinbo | 428/404 |
| 5,110,474 | 5/1992 | Horwitz | 210/635 |
| 5,346,618 | 9/1994 | Horwitz | 210/198.2 |
| 5,734,043 | 3/1998 | Murakami | 536/30 |
| 5,736,259 | 4/1998 | Oda | 428/532 |

FOREIGN PATENT DOCUMENTS

| | | | |
|---|---|---|---|
| 57-150432 | 9/1982 | Japan | 210/198.2 |
| 60-40952 | 3/1985 | Japan | 210/198.2 |
| 60-82858 | 5/1985 | Japan | 210/198.2 |
| 60-108751 | 6/1985 | Japan | 210/198.2 |

*Primary Examiner*—Ernest G. Therkorn
*Attorney, Agent, or Firm*—Flynn, Thiel, Boutell & Tanis, P.C.

[57] ABSTRACT

There is provided a packing material having a carrier coated with a substance having a separating capacity for high-performance liquid chromatography, wherein the performance of the packing material can be sufficiently exhibited with little dispersion of separating capacity thereof. The packing material contains part of a coating solvent remaining therein, whereby the excellent separating capacity of the packing material can be exhibited.

14 Claims, 1 Drawing Sheet

Results of Experiment on Optical Resolution

PACKING MATERIAL FOR HIGH-PERFORMANCE LIQUID CHROMATOGRAPHY

TECHNICAL FIELD TO WHICH THE INVENTION PERTAINS

The present invention relates to a packing material for high-performance liquid chromatography, and provides a packing material having an excellent separating capacity with little dispersion particularly in the field of separation of optical isomers.

PRIOR ART

There are a variety of packing materials for high-performance liquid chromatography, examples of which include one comprising a granulated (crushed or bead-like) substance having a separating capacity in itself, one having such a substance chemically bonded to a carrier, and one having a carrier coated with such a substance. Particularly in the field of separation or optical isomers, a packing material having a carrier coated with an optically active substance having the capacity of separation of optical isomers is actually used in many cases. Known examples of such a packing material include one having a carrier coated with an optically active crown ether compound as a low-molecular compound (JP-A 62-210053), one having a carrier coated with an optically active triphenylmethyl methacrylate polymer as a synthetic polymer (JP-A 57-150432), one having a carrier coated with cellulose triacetate as a derivative of a polysaccharide (JP-A 60-82858), one having a carrier coated with cellulose benzoate (JP-A 60-40952), and one having a carrier coated with cellulose phenylcarbamate (JP-A 60-108751), which are commercialized and widely used by virtue of their high optical resolving powers.

However, columns packed with such a packing material, even if packed with the same packing material, sometimes cause a large difference in separating performance, sometimes a good separation but sometimes a poor separation depending on different production lots of the packing material, when some racemic compounds as an object of separation are used. Particularly in the case of preparation (or aliquot), when separation is poor, it is unavoidable to resort to a low-efficiency separating operation by, for example, decreasing the flow rate of a mobile phase into the column or decreasing the feed rate of a sample.

With a view to coping with the foregoing problems, an object to be solved by the present invention is to provide a packing material having a carrier coated with a substance having a separating capacity for high-performance chromatography, wherein the capacity of the packing material can be sufficiently exhibited with little dispersion of separating capacity thereof.

DISCLOSURE OF THE INVENTION

Figure 1:
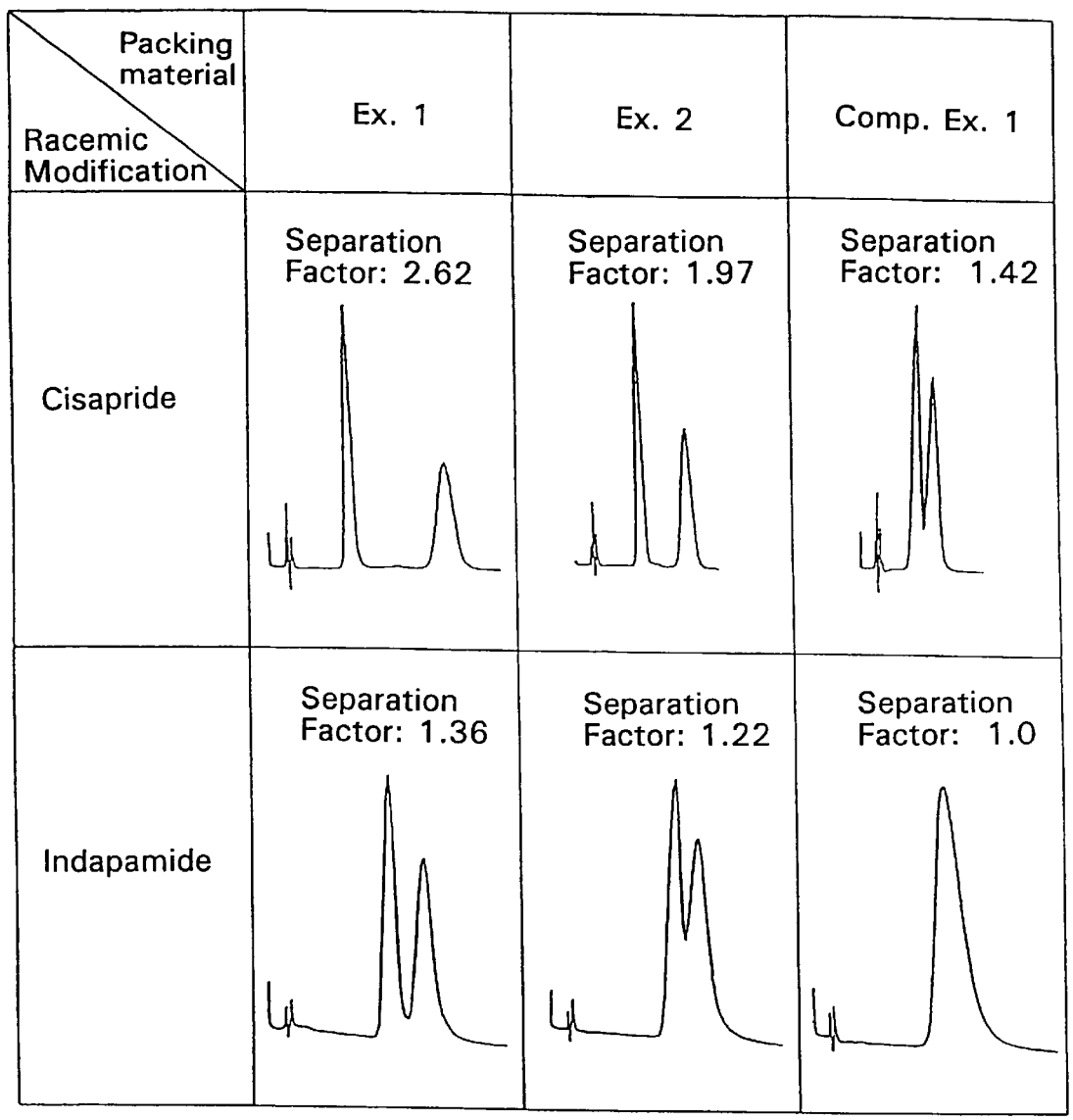
FIG. 1 illustrates the results of the optical resolution tests carried out in Examples 1 and 2 and Comparative Example 1.

As a result of intensive investigations, the inventors of the present invention have found out that the separating capacity of a packing material having a carrier coated with a substance having a separating capacity for high-performance liquid chromatography is affected by the amount of a coating solvent remaining in the packing material. The present invention has been completed based on this finding.

The present invention provides a packing material for high-performance liquid chromatography which has a carrier coated with a substance having a separating capacity and wherein part of the coating solvent remains.

It is preferred that the substance having a separating capacity be an optically active triphenylmethyl methacrylate polymer, an optically active (meth)acrylic amide polymer or a derivative of a polysaccharide, that the substance having a separating capacity be a derivative of a polysaccharide, that the substance having a separating capacity be an ester derivative, carbamate derivative or ether derivative of a polysaccharide, or that the substance having a separating capacity be an aromatic ester derivative of a polysaccharide.

It is further preferred that the substance having a separating capacity be an aromatic ester derivative of a polysaccharide, wherein 30 to 100% on the average of the hydroxyl groups of the polysaccharide are substituted by a group represented by the following formula (I):

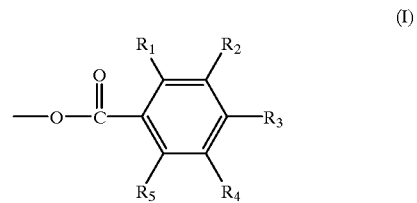

(I)

wherein $R^1$ to $R^5$ are each hydrogen atom, a $C_1$ to $C_8$ alkyl group, a $C_1$ to $C_8$ alkoxyl group, a $C_6$ to $C_{14}$ aromatic group, or a halogen atom.

Among the substance having a separating capacity, cellulose tris(4-methylbenzoate) is preferred.

It is preferred that the coating solvent be a mixture of a low-boiling solvent with a high-boiling solvent, and that the amount of the low-boiling solvent remaining in the packing material be at most 1.5 % by weight, while the amount of the high-boiling solvent remaining in the packing material be 15 to 19% by weight.

It is also preferred that the substance having a separating capacity be a carbamate derivative of a polysaccharide, or that the substance having a separating capacity be an aromatic carbamate derivative of a polysaccharide.

It is further preferred that the substance having a separating capacity be an aromatic carbamate derivative of a polysaccharide, wherein 30 to 100% on the average of the hydroxyl groups of the polysaccharide are substituted by a group represented by the following formula (II):

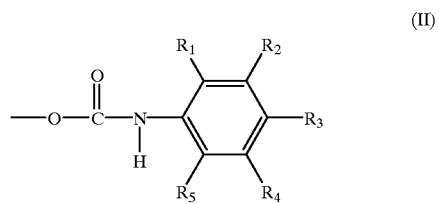

(II)

wherein $R^1$ to $R^5$ are each hydrogen atom, a $C_1$ to $C_8$ alkyl group, a $C_1$ to $C_8$ alkoxyl group, a $C_6$ to $C_{14}$ aromatic group, or a halogen atom.

Among the substance having a separating capacity, cellulose tris(4-chlorophenylcarbamate) is preferred.

It is preferred that the amount of the remaining coating solvent be 4 to 22% by weight, and that the coating solvent be acetone, methylene chloride, dichloromethane, tetrahydrofuran, or dioxane.

It is desired that the low-boiling solvent and the high-boiling solvent be methylene chloride and methyl benzoate, respectively, and that the amount of the remaining coating solvent be 10 to 25% by weight.

The present invention further provides a method of separating an optical isomer by high-performance liquid chromatography, wherein use is made of a packing material which has a carrier coated with a substance having a separating capacity and in which part of a coating solvent remains; and a high-performance liquid chromatography column packed with a packing material which has a carrier coated with a substance having a separating capacity and in which part of a coating solvent remains.

In the present invention, any substance may be used as the substance having a separating capacity in so far as it has a capacity of separation of liquid mixture. Examples of that substance include an optically active triphenylmethyl methacrylate polymer, an optically active (meth)acrylic amide polymer, and derivatives of polysaccharides, among which derivatives of polysaccharides are preferred.

Any polysaccharide may be used as the starting material of a derivative of the polysaccharide irrespective of whether it is a synthetic polysaccharide, a natural polysaccharide or a modified natural polysaccharide in so far as it has optical activity, though polysaccharides having a high regularity of bonding mode are preferred. Examples of the polysaccharide include β-1,4-glucan (cellulose), α-1,4-glucan (amylose, amylopectin), α-1,6-glucan, β-1,4-galactan, β-1,6-glucan (pustulan), β-1,3-glucan (e.g., curdlan, schizophyllan), α-1,3-glucan, β-1,4-mannan, α-1,6-mannan, β-1,2-fructan (inulin), β-2,6-fructan (levan), β-1,4-xylan, β-1,4-chitosan, β-1,4-N-acetylchitosan (chitin), pullulan, agarose, and alginic acid. Other examples include starch containing amylose and cyclodextrins as cyclic polysaccharides. Especially preferred are β-1,4-glucan (cellulose), α-1,4-glucan (amylose, amylopectin), β-1,4-chitosan, β-1,4-N-acetylchitosan (chitin), β-1,4-mannan, β-1,4-xylan, inulin, curdlan, and cyclodextrins, since they can each be easily obtained in the form of a high-purity polysaccharide. The number-average degree of polymerization (the average number of pyranose rings or furanose rings contained in one molecule) of the polysaccharide is at least 2, preferably at least 5, with no particular upper limit, though it is preferably at most 500 because of easy handleability.

Kinds of derivatives of polysaccharide usable in the present invention include ester derivatives, carbamate derivatives, and ether derivatives, among which ester derivatives and carbamate derivatives are preferred. Further preferred are aromatic ester derivatives and aromatic carbamate derivatives.

An ordinary reaction of an alcohol with an acid chloride or an acid bromide for ester formation can be applied as such to the synthesis of an aromatic ester derivative of a polysaccharide, which can be obtained, for example, by reacting the polysaccharide with the corresponding acid chloride or acid bromide in a suitable solvent in the presence of a Lewis base such as a tertiary amine.

An ordinary reaction of an alcohol with an isocyanate for urethane formation can be applied as such to the synthesis of an aromatic carbamate derivative of a polysaccharide, which can be obtained, for example, by reacting the polysaccharide with an isocyanate having the corresponding aromatic ring in a suitable solvent in the presence of a Lewis base such as a tertiary amine or a Lewis acid such as a tin compound as the catalyst. Meanwhile, the isocyanate can be easily synthesized, for example, by reacting the amino group of the corresponding aniline derivative with phosgene.

The carrier to be used in the present invention may be any of organic and inorganic carriers, preferably an inorganic carrier. Suitable examples of the inorganic carrier include silica gel, alumina, magnesia, titanium oxide, glass, silicates, and kaolin, among which silica gel is especially preferred. The particle size of the carrier, though varies depending on the size of a column to be used, is generally 1 μm to 10 mm, preferably 1 μm to 300 μm. The carrier is preferably porous in an aspect of properties. In this case, the average pore size of the carrier is 10 Å to 100 μm, preferably 50 Å to 50,000 Å. The amount of the derivative of the polysaccharide that may be supported on the carrier is 1 to 100% by weight, preferably 5 to 50% by weight, based on the carrier.

According to a method of supporting the aromatic ester derivative or carbamate derivative of the polysaccharide on the carrier, the aromatic ester derivative or carbamate derivative of the polysaccharide is dissolved in solvent to prepare a dope, which is then dropped little by little into the carrier under stirring to uniformly coat the carrier therewith, and the coated carrier, after the completion of coating, is heated and dried under reduced pressure or in an air stream to remove the solvent.

When the solvent to be used for supporting the aromatic ester derivative of the polysaccharide on the carrier, i.e., the coating solvent, is a solvent mixture of a low-boiling solvent capable of well dissolving the aromatic ester derivative of the polysaccharide with a high-boiling solvent capable of swelling the aromatic ester derivative of the polysaccharide, it is possible to secure a good separating capacity. Usable low-boiling solvents include methylene chloride (boiling point: 40° C.) and the like, while usable high-boiling solvents include methyl benzoate (boiling point: 200° C.) and the like.

Examples of the solvent to be used in supporting the carbamate derivative of the polysaccharide on the carrier include acetone, methylene chloride, dichloromethane, tetrahydrofuran and dioxane.

In the present invention, it is a matter of importance that part of the coating solvent be let to remain in the packing material in the step of removing the coating solvent by drying.

In the case of the aromatic ester derivative of the polysaccharide, it is preferred that the amount of the solvent remaining in the packing material be 10 to 25% by weight as a whole. When it exceeds 25% by weight, the mutual agglomeration of particles occurs to make the packing material unusable. In a packing material having the carrier coated with the aromatic ester derivative of the polysaccharide, it is preferred that the amount of the low-boiling solvent remaining in the packing material be at most 1.5% by weight, and that the amount of the high-boiling solvent remaining in the packing material be 15 to 19% by weight. When the amounts of the solvents remaining in the packing material are within these ranges, the packing material exhibits a good separating capacity. In order that the amounts of the solvents remaining in the packing material fall within these ranges, drying conditions after coating, i.e., temperature, pressure, time, etc., are determined experimentally, and the packing material is produced under the determined drying conditions.

In the case of an aromatic carbamate derivative of a polysaccharide, it is preferred that the amount of the remaining solvent be 4 to 22% by weight.

The customary slurry packing method is used as the method of packing the resulting packing material with a column. In this method, n-hexane, 2-propanol, methanol or the like is used as the solvent.

The packing material of the present invention for high-performance liquid chromatography, wherein part of a coating solvent remains, can sufficiently exhibit its capacity with little dispersion of separating capacity. Particularly in the case of preparation (or aliquot), the problem of a low-efficiency separating operation caused by a decrease in the flow rate of a mobile phase into a column and a decrease in the feed rate of a sample, which has hitherto been unavoidable in the case of poor separation, can be solved by the present invention.

EXAMPLES

The following Examples will specifically illustrate the present invention, though it should not be construed as limiting the scope of the present invention.

Example 1

10 g of cellulose tris(4-methylbenzoate) was dissolved in a solvent mixture of 40 ml of methylene chloride and 10 ml of methyl benzoate to prepare a viscous dope, which was then dropped little by little into 40 g of silica gel treated with aminopropylsilane carbamoylated with 3,5-dimethylphenyl isocyanate (manufactured by Daiso Co., Ltd., average particle size: 20 μm, average micropore size: 1300 Å) under stirring at 25° C. After the completion of dropping, methylene chloride was mainly distilled away under further stirring first under 500 Torr. at 40° C. for 45 minutes and then under 100 Torr. at 40° C. for 1 hour. Thereafter, the packing material was dispersed in 200 ml of methanol to give a slurry, which was then filtered to recover a solid material. The recovered solid material was then dried under 2 to 5 Torr. at 60° C. for 3 hours to give a packing material. The results of measurement of the amounts of the solvents remaining in this packing material are shown in Table 1.

Example 2

Substantially the same procedure as in Example 1 except that the final drying time in Example 1 was changed to 2.5 hours was repeated to prepare a packing material. The results of measurement of the amounts of the solvents remaining in this packing material are shown in Table 1.

Comparative Example 1

Substantially the same procedure as in Example 1 except that the final drying time in Example 1 was changed to 2 hours was repeated to prepare a packing material. The results of measurement of the amounts of the solvents remaining in this packing material are shown in Table 1.

TABLE 1

Amounts of Solvents Remaining in Packing Material (wt. %)

| | Packing material | | |
|---|---|---|---|
| Solvent | Ex. 1 | Ex. 2 | Comp. Ex. 1 |
| methylene chloride | 0.22 | 1.07 | 1.72 |
| methyl benzoate | 17.9 | 18.0 | 18.0 |

Application Example A

Each of the packing material prepared in Example 1, Example 2 and Comparative Example 1 was fed into a stainless steel column (inner diameter: 1.0 cm, length: 25 cm) by the slurry method wherein an n-hexane/2-propanol (volume ratio 7/3) was used as a solvent mixture. With this column, the optical resolution experiments of racemic modification of cisapride was carried out under the following conditions. The experimental results (separation factor and chromatogram) are shown in Table 2.

- mobile phase: n-hexane/2-propanol (volume ratio 7/3) containing 0.1% of diethylamine
- flow rate: 4.7 ml/min
- detection: ultraviolet detector, 254 nm (sensitivity: 0.16 AFUS)
- temperature: 25° C.
- amount of feed: 50 μg Application Example B Each of the packing material prepared in Example 1, Example 2 and Comparative Example 1 was fed into a stainless steel column (inner diameter: 1.0 cm, length: 25 cm) by the slurry method wherein an n-hexane/2-propanol (volume ratio 7/3) was used as a solvent mixture. With this column, the optical resolution experiments of racemic modification of indapamide was carried out under the following conditions. The experimental results (separation factor and chromatogram) are shown in Table 2. Table 2 has been presented as FIG. 1. A reference to Table 2 is the same as a reference to FIG. 1.

- mobile phase: n-hexane/2-propanol (volume ratio 7/3) containing 0.1% of diethylamine
- flow rate: 4.7 ml/min
- detection: ultraviolet detector, 254 nm (sensitivity: 0.16 AFUS)
- temperature: 25° C.
- amount of feed: 50 μg Example 3

10 g of cellulose tris(4-chlorophenylcarbamate) was dissolved in 65 ml of acetone to prepare a viscous dope. This dope was then dropped little by little into 40 g of silica gel treated with aminopropylsilane (manufactured by Daiso Co., Ltd., average particle size: 20 μm, average micropore size: 1300 Å) under stirring at 25° C. The system was adjusted to a reduced pressure (350 Torr.) under further stirring, followed by distilling acetone away at a temperature of 45° C for 1 hour. Thereafter, the packing material was dispersed in 250 ml of 2-propanol to give a slurry, which was then filtered to recover a solid material. The solid material thus obtained was dried under 2 to 5 Torr. at 60° C. for 3 hours to give a packing material. The result of measurement of the amount of the solvent remaining in this packing material is shown in Table 3.

TABLE 3

| | Amt. of remaining coating solvent (wt. %) | Results of expt. on opt. resoln. | | |
|---|---|---|---|---|
| | | retentn. vol. ($k'_1$) | separatn. factor ($\alpha$) | resoln. (Rs) |
| Ex. 3 | 20.1 | 1.89 | 3.10 | 3.17 |
| Ex. 4 | 10.8 | 2.18 | 3.17 | 3.22 |
| Ex. 5 | 4.7 | 1.96 | 3.22 | 3.34 |
| Comp. Ex. 2 | 27.6 | 2.02 | 3.09 | 2.91 |
| Comp. Ex. 3 | 3.3 | 2.14 | 3.34 | 2.70 |

Examples 4 and 5 and Comparative Examples 2 and 3

Substantially the same procedure as in Example 3 except that the final drying time in Example 3 was varied was repeated to prepare a variety of packing material as shown in Table 3.

Application Example C

Each of the packing material prepared in Examples 3, 4 and 5 and Comparative Examples 2 and 3 was fed into a stainless steel column (inner diameter: 1.0 cm, length: 25 cm) by the slurry method wherein an 2-propanol was used. With this column, the optical resolution experiments of racemic modification of disopyramide was carried out under the following conditions. The experimental results are shown in Table 3.

mobile phase: n-hexane/2-propanol (volume ratio 1/1) containing 0.1% of diethylamine flow rate: 4.7 ml/min detection: ultraviolet detector, 254 nm (sensitivity: 0.16 AFUS)

temperature: 25° C.

amount of feed: 50 μl (1,000 ppm)

As can be seen in Table 3, the resolution was low and so unsuitable for preparation of disopyramide in Comparative Examples 2 and 3 wherein the amount of the remaining acetone as the coating solvent departed from the range of 4 to 22% by weight.

Example 6

10 g of cellulose tris(4-chlorophenylcarbamate) was dissolved in 65 ml of acetone to prepare a viscous dope. This dope was then dropped little by little into 40 g of silica gel treated with aminopropylsilane (manufactured by Daiso Co., Ltd., average particle size: 50 μm, average micropore size: 1000 Å) under stirring at 25° C. The system was adjusted to a reduced pressure (350 Torr.) under further stirring, followed by distilling acetone away at a temperature of 45° C. for 1 hour. Thereafter, the resulting packing material was dispersed in 250 ml of 2-propanol to give a slurry, which was then filtered to recover a solid material. The solid material thus obtained was dried under 2 to 5 Torr. at 60° C. for 3 hours to give a packing material. The result of measurement of the amount of the solvent remaining in this packing material is shown in Table 4.

TABLE 4

| | Amt. of remaining coating solvent (wt. %) | Results of expt. on opt. resoln. | | |
|---|---|---|---|---|
| | | retentn. vol. ($k'_1$) | separatn. factor (α) | resoln. (Rs) |
| Ex. 6 | 18.2 | 3.81 | 1.31 | 0.71 |
| Ex. 7 | 4.4 | 4.30 | 1.29 | 0.61 |
| Comp. Ex. 4 | 23.1 | 3.54 | 1.22 | 0.31 |
| Comp. Ex. 5 | 1.5 | 3.96 | 1.17 | 0.21 |

Example 7 and Comparative Examples 4 and 5

Substantially the same procedure as in Example 6 except that the final drying time in Example 6 was varied was repeated to prepare a variety of packing material as shown in Table 4.

Application Example D

Each of the packing material prepared in Examples 6 and 7 and Comparative Examples 4 and 5 was fed into a stainless steel column (inner diameter: 1.0 cm, length: 25 cm) by the slurry method wherein 2-propanol was used. With this column, the optical resolution experiments of racemic modification of perisoxal was carried out under the following conditions. The experimental results are shown in Table 4.

mobile phase: n-hexane/2-propanol (volume ratio 9/1) containing 0.1% of diethylamine flow rate: 4.7 ml/min detection: ultraviolet detector, 254 nm (sensitivity: 0.16 AFUS)

temperature: 25° C.

amount of feed: 50 μl (1,000 ppm)

As can be seen in Table 4, the resolution was low and so unsuitable for preparative chromatography of perisoxal in Comparative Examples 4 and 5 wherein the amount of the remaining acetone as the coating solvent departed from the range of 4 to 22% by weight.

We claim:

1. A packing material for high-performance liquid chromatography which has a carrier coated with a substance having a separating capacity and wherein part of a coating solvent remains and is a mixture of a low-boiling solvent and a high-boiling solvent, and the amount of the low-boiling solvent remaining in the packing is at most 1.5% by weight, while the amount of the high-boiling solvent remaining in the packing material is 15 to 19% by weight.

2. The packing material as claimed in claim 1, wherein the substance having a separating capacity is an optically active triphenylmethyl methacrylate polymer, an optically active (meth)acrylic amide polymer, or a derivative of a polysaccharide.

3. The packing material as claimed in claim 1, wherein the substance having a separating capacity is a derivative of a polysaccharide.

4. The packing material as claimed in claim 1, wherein the substance having a separating capacity is an ester derivative, carbamate derivative or ether derivative of a polysaccharide.

5. The packing material as claimed in claim 1, wherein the substance having a separating capacity is an aromatic ester derivative of a polysaccharide.

6. The packing material as claimed in claim 1, wherein the substance having a separating capacity is an aromatic ester derivative of a polysaccharide, wherein 30 to 100% on the average of the hydroxyl groups of the polysaccharide are substituted by a group represented by the following formula (I):

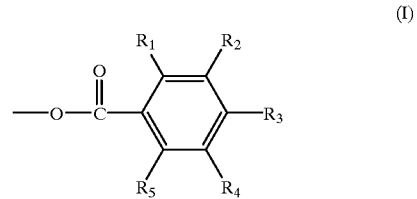

wherein $R^1$ to $R^5$ are each hydrogen atom, a $C_1$ to $C_8$ alkyl group, a $C_1$ to $C_8$ alkoxyl group, a $C_6$ to $C_{14}$ aromatic group, or a halogen atom.

7. The packing material as claimed in claim 1, wherein the substance having a separating capacity is cellulose tris(4-methylbenzoate).

8. The packing material as claimed in claim 1, wherein the substance having a separating capacity is a carbamate derivative of a polysaccharide.

9. The packing material as claimed in claim 1, wherein the substance having a separating capacity is an aromatic carbamate derivative of a polysaccharide.

10. The packing material as claimed in claim 1, wherein the substance having a separating capacity is an aromatic carbamate derivative of a polysaccharide, wherein 30 to 100% on the average of the hydroxyl groups of the polysaccharide are substituted by a group represented by the following formula (II):

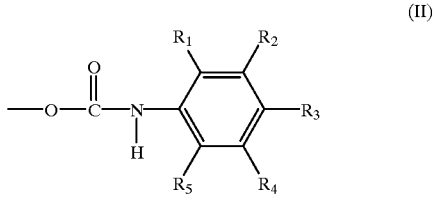

wherein $R^1$ to $R^5$ are each hydrogen atom, a $C_1$ to $C_8$ alkyl group, a $C_1$ to $C_8$ alkoxyl group, a $C_6$ to $C_{14}$ aromatic group, or a halogen atom.

11. The packing material as claimed in claim 1, wherein the substance having a separating capacity is cellulose tris(4-chlorophenylcarbamate).

12. The packing material as claimed in claim 1, wherein the low-boiling solvent is methylene chloride, while the high-boiling solvent is methyl benzoate.

13. A method of separating an optical isomer by high-performance liquid chromatography, wherein use is made of the packing material of claim 1.

14. A high-performance liquid chromatography column, packed with the packing material of claim 1.

* * * * *